United States Patent [19]
Katsimbas et al.

[11] 3,860,563
[45] Jan. 14, 1975

[54] HEAT HARDENABLE FILM-FORMING COPOLYMERS WHICH ARE SOLUBLE IN ORGANIC SOLVENTS

[75] Inventors: Themistoklis Katsimbas, Hamburg; Horst Dalibor, Norderstedt; Hans-Joachim Kiessling, Hamburg; Rolf Schmidt, Pinneberg, all of Germany

[73] Assignee: Reichhold-Albert-Chemie Aktiengesellschaft, Frankfurt/Main, Germany

[22] Filed: Sept. 10, 1973

[21] Appl. No.: 395,777

[30] Foreign Application Priority Data
Sept. 19, 1972  Switzerland................ 13676/72

[52] U.S. Cl...... 260/72 R, 260/28.5 R, 260/32.8 N, 260/33.4 R, 260/42.54, 260/78.5 R, 260/80.73, 260/851, 117/123 C, 117/132 B
[51] Int. Cl............................................ C08f 15/40
[58] Field of Search................ 260/72 R, 80.73

[56] References Cited
UNITED STATES PATENTS
3,453,345   7/1969   Mabrey et al................ 260/834

FOREIGN PATENTS OR APPLICATIONS
1,127,232   9/1968   Great Britain

*Primary Examiner*—Stanford M. Levin
*Attorney, Agent, or Firm*—Gordon W. Hueschen

[57] ABSTRACT

It is a task of the present invention to produce, through special selection measures, film-forming copolymers of styrene, acrylic acid, N-alkoxyalkylmethacrylic acid amides and alkyl acrylates, which are soluble in organic solvents and which are suitable for the manufacture of improved stoving lacquers, preferably for the lacquering of thin plate, for instance tinplate sheet, iron sheet, aluminum sheet, which can be coiled up and can be shaped and punched by the converter, with the lacquering remaining undamaged even in stretched and punched areas (roller coating-, strip coating- and can coating process).

6 Claims, No Drawings

HEAT HARDENABLE FILM-FORMING COPOLYMERS WHICH ARE SOLUBLE IN ORGANIC SOLVENTS

BACKGROUND OF THE INVENTION

1. Field of the Invention

Up to now, special alkyd resins have been employed for this purpose, which resins do not prove resistant enough to yellowing.

The results of the tube-compression test are not sufficient, and the resistance to stacking is also not satisfactory.

The main task is to provide and employ copolymers which are suitable for use as the sole binders for lacquers for use in punching work and in the manufacture of tubes, and which are distinguished by improved resistance to yellowing under the action of heat, better elasticity at temperatures between +20°C and −20°C and improved pigment-binding capacity, as well as very good properties in the tube-compression test of −7°C to −20°C.

Furthermore, the stoved films are distinguished by the necessary resistance to stacking.

2. Prior Art

German Auslegeschrift No. 1,102,410 discloses stoving lacquers which contain
I. organic solvents and
II. copolymers of
A. esters of acrylic acid or methacrylic acid with alkanols,
B. ethers of N-methylolacrylic acid amide or -methacrylic acid amide with alkanols or phenylalcohols,
C. monoesters of acrylic acid or methacrylic acid with polyhydric hydroxy compounds and optionally also
D. other compounds possessing an ethylenically unsaturated copolymerizable group, such as acrylonitrile, acrylic acid and methacrylic acid, higher esters of ethylenecarboxylic acids, styrene and vinyl acetate. Such stoving lacquers are distinguished by a series of valuable properties.

The subject of the present invention is a process for the manufacture of film-forming copolymers which are soluble in organic solvents, by special measures from styrene, acrylic acid, N-alkoxyalkylmethacrylic acid amides, which copolymers may be employed for making improved stoving lacquers. Up to now, special alkyd resins, alkyd resin-aminoplast combinations and copolymers have been used for this purpose. These are expected to have good levelling properties, sufficient hardness, punching and deep drawing quality, stacking resistance, sterilization strength, excellent tube compression test, high gloss and resistance to yellowing when applied as lacquer onto thin plate sheet with the aid of an applicator roll or a spray gun and after stoving of the lacquer at high temperatures. Alkyd resins modified by styrene and methylmethacrylate, as described in German Offenlegungsschrift No. 2,123,177 give highly valuable lacquerings on sheet metal having high gloss, good elasticity, punching resistance and tube compression up to −2°C as well as sterilization strength. The resistance against yellowing, however, is not sufficient in most cases with these systems, especially at thermic treatment at above 180°C or for longer periods at 160° − 170°C. Other disadvantages are not sufficient stacking resistance and not satisfactory adhesion and elasticity in a compression test down to −20°C, which has been requested recently by practical application of such lacquers.

Copolymers based on acrylic esters and methacrylic esters, as well as methylol derivatives or methylolether derivatives of acrylamide or methacrylamide, respectively, and a monomeric polymerizable acrylate compound having a free alcoholic hydroxyl group, give stoving lacquers which are resistant against yellowing but which show bad adhesion during cup deeping and also show bad sterilization strength.

The U.S. Pat. No. 3,453,345 discloses hot curable resins based on acrylamide, a low molecular aliphatic aldehyde, an alcohol, a hydroxypolyoxyalkylene carboxylic acid ester and an α,β-ethylenically unsaturated carboxylic acid and a further monomeric compound containing a vinyl group, which resins give stoving lacquers having a good resistance against yellowing and stacking resistance, but which show the disadvantage of bad cup deeping, bad sterilization strength and a tube compression test not being sufficient at −20°C.

The main subject of the present invention is to present copolymers which give sole binders suitable for sheet metal lacquers, especially for decorative wrapping sheet metal lacquers as well as for punching sheet metal and tube sheet metal and which show a higher resistance against yellowing of the stoved films under action of heat, special elasticity at −20°C as well as very good properties in the tube compression test at −7°C to −20°C, high gloss and excellent stacking resistance.

A simultaneous subject of the present invention is to present copolymers for the already mentioned application which have sufficient ability of being pigmented with unobjectionable covering power even in this layers of about 10 μ dry film strength, in connection with good gloss and good sterilization strength.

SUMMARY

The subject of the invention is a process for the manufacture of film-forming copolymers which are soluble in organic solvents, by copolymerization of styrene, acrylic acid, N-alkoxyalkylmethacrylic acid amides, alkyl acrylates in organic solvents in the presence of polymerization initiators and, optionally, regulators, characterized in that a mixture consisting of:

a. 32 to 40 percent by weight of styrene,
b. 1 to 3% by weight of acrylic acid,
c. 4 to 8% by weight of an ether of N-methylolmethacrylamide with a saturated alkanol which possesses 4 carbon atoms,
d. 48 to 56 percent by weight of n-butyl acrylate and
e. 2 to 6 percent by weight of hydroxyalkyl esters of methacrylic acid of the following formula:

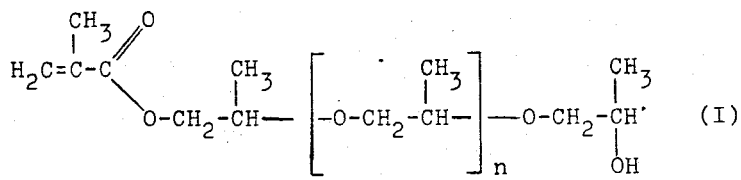

wherein n represents numerical values between 2 an 6, and the compound of the formula (I) or its mixtures possess hydroxyl numbers of about 100 to about 200 and the sum of the percentages of the compounds designated (a) to (e) is in each case 100, is copolymerized by heating.

A specially preferred embodiment of the process is characterized in that a mixture consisting of:
a. 34 to 36 percent by weight of styrene,
b. 2 to 3 percent by weight of acrylic acid,
c. 5 to 7 percent by weight of an ether of N-methylolmethacrylamide with n-butanol,
d. 50 to 54 percent by weight of n-butyl acrylate and
e. 2 to 4 percent by weight of hydroxyalkyl esters of methacrylic acid, of formula (I) given above, is copolymerized by heating.

A further, greatly preferred, special embodiment of the process is characterized in that a mixture consisting of:
a. 35 to 36 percent by weight of styrene,
b. 2.5 to 3 percent by weight of methacrylic acid,
c. 6 to 7 percent by weight of an ether of N-methylolmethacrylamide with n-butanol,
d. 52 to 53 percent by weight of n-butyl acrylate and
e. 2 to 3 percent by weight of hydroxyalkyl esters of methacrylic acid of the abovementioned formula (I), whereby the component (e) has hydroxyl numbers of 145 – 160, is copolymerized by heating.

In the preferred embodiment of this invention a copolymer is produced from the following monomers by solvent polymerization:
a. 35.5 percent by weight of styrene,
b. 2.9 percent by weight of acrylic acid,
c. 6 percent by weight of an ether of N-methylolmethacrylamide with n-butanol,
d. 52 percent by weight of n-butylacrylate and
e. 2.4 percent by weight of hydroxyalkylesters of methacrylic acid and polypropyleneglycol, whereby the ester has a hydroxyl number of about 145 – 160, a saponification number of 140 – 160 and a boiling point of 290° – 295°C at 760 mm air pressure.

A special further embodiment of the process is characterized in that the ether of N-methylolmethacrylamide with n-butanol which is employed contains, in its solution, the catalyst or its esterification products, maleic anhydride having been employed as the catalyst.

The ether of N-methylolmethacrylamide with n-butanol is obtained by a particularly suitable reaction of the reactants in the ratio of 1 mol of methacrylamide, 1 to 1.5 mols of paraformaldehyde and 1 to 3 mols of n-butanol, and maleic anhydride, with warming and with far-reaching removal of water. The most suitable reaction product is one in which the ratios of the reactants are 1 mol of methacrylamide, 1.2 mols of paraformaldehyde and 2 mols of n-butanol and 0.01 to 0.03 mol of maleic anhydride. The reaction mixture of methacrylamide, paraformaldehyde, n-butanol and maleic anhydride which is employed gives, after reaction solutions of approx. 65 percent by weight ± 3 percent by weight of the ether of N-methylolmethacrylamide with n-butanol, and approx. 35 percent by weight ± 3 percent of n-butanol.

For the most preferred embodiment of the component (c) as the ether of N-methylolmethacrylamide with n-butanol, the reaction mixture solution from the reaction of 4 mols of methacrylamide, 4.67 mols of paraformaldehyde, 8 mols of n-butanol and 0.03 mol of maleic anhydride, with removal of water is employed.

Such a reaction batch contains approximately:
64.0 percent by weight of the ether of N-methylolmethacrylamide with n-butanol,
32.5 percent by weight of n-butanol,
0.8 percent by weight of paraformaldehyde,
1.6 percent by weight of water,
0.6 percent by weight of methacrylamide and
0.5 percent by weight of maleic acid mono-n-butyl ester.

The polypropylene glycol mixtures used for manufacture of component (e) have an average molecular weight of about 200 to about 500, preferably 250 – 300. These hydroxyalkyl esters of methacrylic acid have hydroxyl numbers of about 100 to about 200. The particularly preferred hydroxyalkyl esters of methacrylic acid have hydroxyl numbers of about 145 to about 160, saponification numbers of about 140 – 160 and a boiling region of 290° to 295°C at 760 mm air pressure.

Suitable solvents for the production of the copolymers are the customary alkylbenzenes, such as toluene, xylene or mesitylene or alkylnaphthalenes with boiling points of about 180°C to 270°C, optionally by adding alcohols, such as n- and i-butanols, monoethers of diols, such as ethanediol monomethyl ether, and diethylene glycol monobutyl ether, esters of alkanols, such as ethyl acetate, and monoethermonoesters of diols, such as ethanediol monomethyl ethermonoacetic acid ester, as well as mixtures of such substances with one another or with added benzine hydrocarbons of boiling points about 180°C to 280°C.

In the preferred and most preferred embodiment of the process a solvent mixture of aromatic hydrocarbons, having a boiling point of about 187 to about 213°C, and of ethylene glycolmonoethylether is employed. The most suitable ratio is described in Example 1.

The manufacture of the copolymers can be carried out by solution polymerization in such solvents which are also intended to be constituents of the finished stoving lacquers. The polymerization can appropriately be initiated by the customary initiators, or initiator systems of initiators and activators.

Suitable polymerization initiators for the process according to the invention are all compounds which form free radicals under the reaction conditions. Peroxy compounds and azonitriles are preferred. Examples of suitable peroxy compounds are dibenzoyl peroxide, dilauroyl peroxide, dimethyl peroxide, diethyl peroxide, di-tert.-butyl peroxide, tert.-butyl peroctoate, dioctadecyl peroxide, t-butyl peroxypivalate, disuccinoyl peroxide, urea peroxide, peracetic acid and perbenzoic acid. Examples of suitable azonitriles are 1,1-azodicyclohexanecarbonitrile, $\alpha,\alpha'$-azobis-($\alpha$-cyclopropylpropionitrile), $\alpha,\alpha'$-azobis-(isobutyronitrile), $\alpha,\alpha'$-azobis-($\alpha,\gamma$-dimethylvaleronitrile), $\alpha,\alpha'$-azobis-($\alpha$-methyleneanthronitrile), $\alpha,\alpha'$-azobis-($\alpha$-phenylpropionitrile), $\alpha,\alpha'$-azobis-($\alpha$-cyclohexylpropionitrile), $\alpha,\alpha'$-azobis-($\alpha$-methyl-$\gamma$-carboxybutyronitrile), disodium $\gamma,\gamma'$-azobis-($\gamma$-cyanovalerate) and 1,1'-azodicamphanecarbonitrile.

The use of such polymerization initiators is made by consideration of the employed solvents and of the desired polymerization temperature as is known by a person skilled in the art. In the preferred and most preferred embodiment of the method tert. butylperoctoate is employed.

The degree of polymerization, and hence the viscosity, of the copolymers can be adjusted through co-use of the customary regulators, such as mercaptans and aldehydes. Chain-regulating mercaptans are butylmercaptan, octylmercaptan, laurylmercaptan and tert.-dodecylmercaptan.

A preferred process for the manufacture of the new copolymers consists of allowing the monomer mixture, including the polymerization catalysts and, where relevant, chain regulators, separately or as a mixture, to run evenly over a period of about one to ten hours into the solvent mixture which is heated to 105° – 115°C and consists of aromatic solvents of boiling point 180°C to 270°C and ethyl glycol, the ratio of aromatics to ethyl glycol being between 1 : 1 and 3 : 1, under an inert gas, preferably nitrogen; the polymerization temperature should be between 90°C and about 115°C. The polymerization is then continued for about 2 to 8 hours longer in order to achieve as nearly complete conversion of the monomers as possible. In order reliably to exclude gel formation during the polymerization, the polymerization temperature should not exceed 130°C, even briefly, in the case of the solvent mixtures indicated above, and should instead as far as possible remain within the indicated temperature range.

In the preferred embodiment of the process, the polymerization initiators or polymerization catalysts are employed in amounts of 0.6 to 1.5 percent by weight relative to the weight of the monomer mixture, tertiary butyl peroctoate being the most suitable compound to use.

The improvements in the copolymers and in the stoving lacquers which can be manufactured therewith, which have been achieved by a quantitative and also a special qualitative selection of the monomeric components (a) to (e), are surprising and unforeseeable, particularly since it was to have been expected that, because of the low proportion of the component (c), the copolymers should have had predominantly thermoplastic properties after stoving. It is all the more surprising that, on using the copolymers manufactured from the components (a) to (e), stoving lacquers are obtained which after stoving show an adequate degree of crosslinking which makes it possible to obtain solvent-resistant, weathering-resistant and extremely elastic lacquerings.

Particularly suitable copolymers are in the form of a 50% strength solution in a solvent mixture of aromatic solvents (aromatic hydrocarbons) of boiling point 187°C to 213°C and ethyl glycol (weight ratio of hydrocarbons to ethyl glycol = 2 : 1) and have a Gardner-Holt viscosity of about V to W.

The copolymers produced according to the invention are in particular distinguished through having an improved pigment binding capacity, for instance an ability to be pigmented up to 300 percent by weight with titanium dioxide (rutile) with a resulting high gloss of stoving lacquers being stoved for instance at 160°C for 30 minutes. The lacquerings manufactured with the copolymers develop their valuable properties practically completely already after relatively short stoving times (for example 1 to 3 minutes) at 260°C – 270°C. Furthermore, lacquers manufactured from such copolymers give lacquerings of improved adhesion and impact resistance and of particularly pronounced elasticity and hardness. The lacquering obtained also possess other properties, such as light stability, flexural strength, solvent resistance and temperature resistance, to a particular degree. The new copolymers are especially suitable for use as lacquers for decorative sheet metal for tubes, cans, buckets and other metal containers, utensils for household and laboratory, and metal closures, since they give excellent films after stoving at between 100°C and 200°C for 5 to 30 minutes depending on the object coated.

Using the copolymers manufactured according to the invention it is possible to manufacture stoving lacquers which contain, if desired, the additives customary for stoving lacquers, such as pigments, soluble dyestuffs, optical brighteners and agents for assisting levelling and gloss. In particular, the stoving lacquers can contain, additionally to the copolymers, customary lacquer binders of other kinds, such as alkyd resins, aminoplast resins, phenoplast resins, epoxide resins, cellulose derivatives and polymers which are not identical with the copolymers of this invention, in a dissolved and/or dispersed form, for example polyvinylidene difluoride by itself or in combination with plasticisers. The weight ratio of the copolymers to the additional lacquer binders of other kinds should in general appropriately be greater than 1 and in particular greater than 2. The addition of the customary lacquer binders of other kinds to the copolymers must be so chosen, as to type and amount, that clear solutions are obtained and that after the stoving process clear films are obtained. Furthermore, it has generally proved desirable that the weight ratio of the solvents to the total proportion of binder in the stoving lacquers should be about 0.4 to 3, especially about 0.6 to 1.5.

To manufacture lacquerings, the stoving lacquers based on the new copolymers can be applied to the articles to be lacquered using the customary methods, for example by spraying, brushing, casting, roller application, flooding, dipping or impregnation. The stoving of the lacquerings can generally take place appropriately at temperatures of about 160°C to 300°C, especially about 160°C to 170°C and for a period of about 0.5 to 40 minutes, depending on the temperature, and especially at about 160°C for 30 to 40 minutes. The stoving process for tube lacquerings start with a pre-drying period of about 5 – 8 minutes at 80° – 100°C and then the end-stoving over 6 – 8 minutes at 140° – 160°C follows.

Since the valuable properties of the lacquerings come into play particularly on metals, such as iron, aluminum, magnesium and alloys of these metals, the stoving lacquers are above all suitable for lacquering articles made of sheet metal, for example parts of bodywork, ships and can equally be used for the manufacture of primers and top coats; because of their good adhesion, they are furthermore very suitable for the production of singlecoat lacquerings on metals, in which case the high surface gloss generally makes subsequent polishing superfluous.

If the lacquerings are to be stoved at lower temperatures, say for 20 to 40 minutes below 160°C, and/or if stoving lacquers are to be used which contain relatively little copolymerized acrylic acid in the copolymer, it can be advisable to stove the stoving lacquers in the presence of curing agents.

Acids or substances which split off acids, which are customary for curing polymers, for example p-toluenesulphonic acid, maleic acid, phosphoric acid or tartaric acid, are suitable as such curing agents. The amount of the curing agent should generally appropriately be about 0.01 to 5, especially about 0.1 to 2, per cent by weight of the copolymers.

The stoving lacquers are preferably used with the copolymer which has been characterized serving as the sole binder, for single-coat tube lacquers. If tube lacquer qualities are required which show sufficient ability to be printed on already after a stoving time of 6 minutes at 160°C after a pre-drying period of 6 minutes at 80° – 120°C, then the mentioned combination with amine resins, preferably melamin resins is advantageous, also for good tube compression at −20°C and good sterilisation strength of the lacquerings.

However, if stoving lacquers or multi-layer stoving lacquers of particularly high solvent resistance and outstanding surface hardness and gloss retention on weathering are required, the copolymers characterized are used in combination with aminoplasts.

Preferred aminoplasts are condensation products of formaldehyde and melamine, wherein about 4 to 6 mols of formaldehyde have been reacted per mol of melamine under either slightly acid or slightly basic conditions, and which should be etherified almost completely, say to the extent of 80 to 100 percent, with butanol, isobutanol or methanol. The reaction products resulting therefrom should have a molecular weight of about 300 to 1,200 and should be soluble in organic solvents such as xylene and butanol, isobutanol, methanol or glycol ethers and other alcohols. Recipes for suitable melamine resins are to be found as examples in Swiss Pat. No. 480,380 and in German Auslegeschrift No. 1,127,083.

The copolymer and the aminoplast resin are dissolved in the organic solvent in the ratio of 85 to 95 parts by weight of the copolymer and 5 to 15 parts by weight of the aminoplast resin. The ratios of the amounts of the copolymer and of the alkylated aminoplast should be so chosen that the two components are compatible both in the coating solution and in the finished film. Any suitable concentration of the copolymer and of the aminoplast in the solvent, ranging, for example, from 1 to 50 percent by weight, can be used if this proviso is fulfilled. If a pigment is present, the total content of the solids in the coating composition is between 5 and 75 percent by weight. The ratio of pigment to binder (copolymer plus aminoplast) can be between 1 : 20 and 1 : 2.

Stoving lacquers which are manufactured with the copolymers obtainable according to the process of the invention can be improved in surface hardness by addition of micronised polyalkylene wax, for example polyethylene, and preferably polypropylene, with average molecular weights of 1,000 to 10,000, densities of 0.8 to 0.9, melting points of about 140°C and particle sizes of less than 1 μ, preferably less than 0.5 μ, employed in an amount of 0.05 to 2 percent by weight relative to the solids content of the copolymer, without thereby modifying their bend-test values and Gardner impact deep-drawing values.

The parts and percentages mentioned in the examples are by weight.

EXAMPLE 1

Manufacture of copolymer solution 1:

A first mixture, consisting of 294 g of styrene, 431 g of n-butyl acrylate, 24 g of acrylic acid, 20 g of a hydroxyalkyl ester of methacrylic acid which is an esterification product of methacrylic acid and polypropylene glycol of hydroxyl number about 145 – 160 (The polypropylene glycol mixture used for the esterification has an average calculated molecular weight of 260 – 300. The employed esterification product has a saponification number of 140 – 160 and a boiling point of about 290° to 295°C at 760 mm air pressure), and 76 g of a 65 percent strength by weight solution in n-butanol of the ether of n-butylolmethacrylamide with n-butanol, which is in the form of part of a reaction batch manufactured from 4 mols of methacrylamide, 4.67 mols of paraformaldehyde, 8 mols of n-butanol and 0.03 mol of maleic anhydride whilst warming and extensively removing the water, is added dropwise evenly over the course of two hours to a mixture consisting of 452 g of a solvent based on aromatic hydrocarbons of boiling point 187°C to 213°C, 246 g of ethyl glycol and 2 g of tert.-butyl peroctoate at 110°C under a nitrogen atmosphere in a flask equipped with a stirrer, reflux condenser and thermometer. Furthermore, simultaneously with the first mixture, a second mixture consisting of 40 g of aromatic hydrocarbon solvent and 6 g of tert.-butyl peroctoate is added. The reaction batch is kept at about 110°C over the course of the first 60 minutes and during the period from 61 to 120 minutes is allowed to fall to 90°C. Thereafter, the polymerization is continued for a further 6 to 8 hours at 90°C under a nitrogen atmosphere until the solution has a solids content of 51 – 52 percent by weight and the viscosity is V-W according to Gardner-Holdt.

49 g of the 51 percent strength polymer solution were homogenized with 49 g of titanium dioxide pigment (rutile), 1.5 g of a solvent mixture consisting of equal parts of aromatic hydrocarbon containing solvent of boiling point 187° – 213°C and diacetone alcohol for 35 hours in a ball mill. The lacquer thus obtained was diluted with a mixture of 70 percent by weight of solvent containing aromatic hydrocarbons and having a boiling point of 187° – 213°C and of 30 percent by weight of diacetone alcohol to give a viscosity of about 600 cP at 20°C.

The lacquer was subsequently applied to tinplate, the solvent allowed to evaporate off and the lacquer stoved at 160°C for 30 minutes. Glossy, white lacquerings are obtained which show good levelling, very good ability to be deep-drawn, resistance to the crimping test, sterilization strength and resistance to stacking, and excellent elasticity under cold conditions.

Comparison experiments to demonstrate the attained technical advance:

To demonstrate the technical advance achieved relative to the best commercial product for the same purpose, the resin according to Example 1 of the present invention was used. An alkyd resin modified with methyl methacrylate and styrene, according to Example 1 of German Offenlegungsschrift No. 2,123,177, was used as a comparable commercial product.

A white stoving lacquer was manufactured from both comparison resins analogously to Example 1 of the present invention and was applied as a film to tinplate and to tubes made from aluminum sheet. The wet film coating thickness was 100 μ or, in the case of the tubes, 30 – 40 μ. After exposure to the atmosphere for 10 minutes, the lacquerings on white sheet metal were pre-dried at 170°C for 30 minutes and on aluminum sheet metal (for tube compression test) were pre-dried at 100°C for 6 minutes and subsequently stoved at 180°C for 6 minutes.

The films were subjected to the following tests: Pendulum hardness according to Koenig, gloss according to Lange, crimping test and cup deepening capacity according to DIN 53,156, sterilization test for 30 minutes at 121°C in water, yellowing resistance under additional aging for 10 minutes at 205°C, stacking resistance and tube compression test down to −20°C.

Table 1

|  | Example 1 according to the invention | Example 1 DOS 2,123,177 |
| --- | --- | --- |
| Pendulum hardness, 2 hours after oven drying | 64 secs. | 38 secs. |
| Gloss, measured according to Lange | 117% | 111% |
| Crimping test | 0 | 0 |
| Cup deepening | 0 | 0 |
| Sterilization sample | 0 | 0 |
| Yellowing resistance | 0 | 3 |
| Stacking resistance | 0 | 2 |
| Tube compression test | 0 | 5 |

The results in the table 1 show the advantages of the copolymer manufactured according to the invention when used as a sole binder.

In the Tables 1 - 5 the figures denote the following:

```
0 = very good
1 = good
2 = adequate
3 = defective
4 = very defective
5 = totally inadequate
```

Additionally, pigmentation experiments were carried out. In these it was found that even at a pigmentation ratio of 1 : 3 the copolymer manufacture according to the invention, when used as a white lacquer, gave films showing an unchanged high gloss (105 percent according to Lange 45°). The comparison resin, when used in the same way, only gave stoved films of substantially reduced gloss.

The lacquers made of the comparison resins analogous to Example 1 of the present invention are applied to glass plates with a wet film strength of 100 $\mu$ and a dry film strength of 35 $\mu$, stoved at 170°C for 30 minutes and subjected to the test in an Atlas-Weather-O-Meter (Xenon 6,000 W). The decrease of gloss was tested after several subjection periods. Only the exposure time was evaluated. The testing was done according to Lange under an angle of 45°.

Table 2

|  | Example according to invention | Example according to DOS 2,023,177 |
| --- | --- | --- |
| gloss before exposure | 128 % | 120 % |
| after 20$^h$ | 120 % | 120 % |
| after 40$^h$ | 120 % | 72 % |
| after 60$^h$ | 98 % | 69 % |
| after 80$^h$ | 79 % | 67 % |
| after 100$^h$ | 78 % | 40 % |
| after 140$^h$ | 58 % | 35 % |

EXAMPLE 2

Manufacture of a lacquer from 94 percent by weight of copolymer salt according to Example 1 and 6 percent by weight of a melamine formaldehyde resin etherified with butanol.

44 g of 52 percent strength by weight resin solution according to Example 1 are homogenized in a ball mill for 35 hours together with 44 g of titanium dioxide pigment (rutile type), 3 g of melamine formaldehyde resin etherified with butanol, as 50 percent strength by weight solution in butanol, 1.5 g ethyldiglycol, 3.5 g of a mixture of aromatic hydrocarbons of boiling point 165° – 255°C, 2 g of a dipentene-containing solvent, 1.5 g of glycolic acid butylester and 0.5 g of an anti-skin agent.

Thereafter, the lacquer was applied to white sheet metal, air dried and stoved at 160°C for 30 minutes. White, glossy lacquerings showing good levelling, good deep drawing values, crimping test, sterilization strength, stacking resistance and excellent elasticity in the cold, are obtained.

If used for tube lacquering the lacquering is pre-dried at 100°C for 6 minutes and stoved thereafter at 160°C for 6 minutes. These lacquerings show unobjectionable tube compression testing values at −20°C.

Further tests to demonstrate the attained technical advance:

The instructions given in Example 1 of German Displayed No. 1,102,410 were followed 255 g of acrylic acid ethylester, 30 g of n-butoxymethylolmethacrylamide and 15 g of ethyleneglycolmonomethacrylate were polymerized at 70°C in 600 g of acetic acid ethylester with the aid of 14 g of azodiisobutyrodinitril. For polymerizing the mixture of monomeric compounds and the initiator was added dropwise over the period of 2 hours to the acetic acid ethylester. The polymerization was carried on for further 5 hours. The obtained product was named VM1.

According to instructions of U.S. Pat. No. 3,453,345 the copolymer 13 given in Table III of column 10 was made. The amounts of solvent mixture were employed as given in Table III (component A, n-butanol and naphtha). As component B the said mixture of hydroxypropyl polypropoxy methacrylate, acrylamide, 40 percent strength by weight formaldehyde solution in n-butanol, acrylic acid, methylmethacrylate, ethylacrylate, cumolhydroperoxide and azobis-isobutyronitril was employed. The obtained copolymer was named VM2.

As described before the copolymers VM1, VM2 and the copolymer, obtained according to Example 1 of the present invention, were worked to give a white lacquer (according to Example 1) whereby, upon consideration of the concentration of the copolymer solutions employed, the lacquers all have the same content of binder.

The lacquers were applied to a tinplate steel sheet and were then dried at 170°C for one half hour. These lacquer films of lacquers produced from copolymers VM1 and VM2 showed insufficient adhesion after the cup deepening test so that sterilizing tests could not be carried out, compared with lacquer films made with the copolymer of the present invention. The lacquer film made of copolymer VM1 does not have sufficient gloss.

Strongly tacky lacquer films are obtained after drying of the tested lacquers meant for tube lacquers according to drying conditions given by industry, for instance starting with 5 minutes at 120°C and thereafter 5 minutes at 160°C, if the lacquers are made from copolymers VM1 and VM2.

The cold punching test can be carried out at −7°C, however, the lacquer made from copolymer VM2 does not work at −20°C. The cold punching test of the lacquer made according to the present invention (copolymer 1) gives good results at −20°C. Also the resistance against solvents of the stoved films is decreased if the lacquer is made from copolymer VM2 compared with copolymer VM1 and also with the copolymer 1 of the present invention.

From these test results it becomes apparent that copolymers made according to the state of the art do not show adequate film properties for practical use if tested as stoving lacquers under the beforementioned conditions, while stoving lacquers made of the copolymer of the present invention do fulfil all requirements made by practice.

The following Table 3 illustrates the beforementioned test results.

Table 3

| | white lacquer drying: ½ʰ 170°C | | stacking resistance | stoving temperature 5 min. 120°C +5 min. 160°C | | stoving temperature ½ʰ 170°C automobile super-gasoline: exposure time 5 min. | acetone | xylene | gloss according to Lange 45° | |
|---|---|---|---|---|---|---|---|---|---|---|
| | cup deeping | sterilization | | tube compression test | | | | | | |
| | | ½ʰ 121°C | 10 kg 2ʰ 60°C | −7°C | −20°C | | | | | |
| invention Ex. 1 | 0–1 | 0–1 | 0–1 | 0–1 | 0–1 | 2 | 2 | 2 | 117 % | |
| VM 1 | no adhesion 5 | could not be carried out | 1 | 1+) | 2+) | 2 | 2 | 2 | 48 % | 5 min. 120°C +5 min. 160°C +) strongly adhesive (tube lacquer) |
| VM 2 | no adhesion 5 | could not be carried out | 1 | 1+) | 5+) | 3 | 3 | 3 | 108 % | 5 min. 120°C +5 min. 160°C +) strongly adhesive (tube lacquer) |

What is claimed is:

1. A heat hardenable film-forming copolymer composition comprising the interpolymerization reaction product of
   a. 32 to 40 percent by weight of styrene,
   b. 1 to 3 percent by weight of acrylic acid,
   c. 4 to 8 percent by weight of an ether of N-methylol- or N-butylol methacrylamide with a saturated alkanol which possesses 4 carbon atoms,
   d. 48 to 56 percent by weight of n-butyl acrylate, and
   e. 2 to 6 percent by weight of an ester of methacrylic acid having the formula

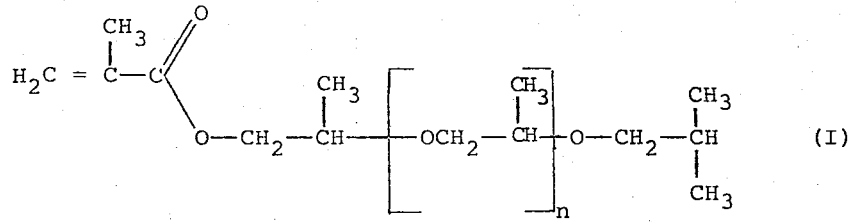

(I)

or mixtures of such compounds, wherein n represents a numerical value of from 2 to 6, and the compound of formula (I) or its mixtures possess a hydroxyl number of from about 100 to about 200, and
   the sum of the percentages of the components (a) to (e) is in each case 100 percent,
   said interpolymerization reaction product being soluble in an aromatic hydrocarbon mixture having boiling points between 180° to 280°C.

2. A composition as in claim 1 wherein the copolymer is the interpolymerization product of
   a. 34 to 36 percent by weight of styrene,
   b. 2 to 3 percent by weight of acrylic acid,
   c. 5 to 7 percent by weight of an ether of N-methylolmethacrylamide with n-butanol,
   d. 50 to 54 percent by weight of n-butyl acrylate, and
   e. 2 to 4 percent by weight of the ester of methacyclic acid (I), or mixtures of such esters.

3. Composition of claim 1 wherein the copolymer is the interpolymerization product of
   a. 35 to 36 percent by weight of styrene,
   b. 2.5 to 3 percent by weight of acrylic acid,
   c. 6 to 7 percent by weight of an ether of N-methylolmethacrylamide with n-butanol,
   d. 52 to 53 percent by weight of n-butyl acrylate, and
   e. 2 to 3 percent by weight of the ester of methacrylic acid (I) or mixtures of such esters, having a hydroxyl number of 145 to 160.

4. Composition of claim 1 wherein the copolymer is the interpolymerization product of
   a. 35.5 percent by weight styrene,
   b. 2.9 percent by weight of acrylic acid,
   c. 6 percent by weight of an ether of n-butylolmethacrylamide with n-butanol,
   d. 52 percent by weight of n-butyl acrylate, and
   e. 2.4 percent by weight of the ester of methacylic acid with polypropylene glycol whereby the ester has a hydroxyl number of 145 to 160, a saponification number of 140 to 160 and a boiling point of 290° to 295°C at 760 mm of air pressure.

5. Composition in accordance with claim 1 wherein the ether component (c) of the copolymer is the reaction product of methacrylamide, paraformaldehyde and n-butanol wherein the molar ratios are from about 1 to about 1.5 mols of paraformaldehyde and 1 to 3 mols of n-butanol, relative to 1 mol of methacrylamide, and an acid or acid donating catalyst.

6. Composition in accordance with claim 1 wherein the N-methylolmethacrylamide/n-butanol ether component (c) contains maleic anhydride or its esterified product.

* * * * *

UNITED STATES PATENT OFFICE
CERTIFICATE OF CORRECTION

Patent No. 3,860,563  Dated January 14, 1975

Inventor(s) THEMISTOKLIS KATSIMBAS

It is certified that error appears in the above-identified patent and that said Letters Patent are hereby corrected as shown below:

[73] Assignee: HOECHST AKTIENGESELLSCHAFT, Frankfurt, Germany

Col. 10, line 16. A period (.) should be inserted after "followed".

Signed and Sealed this ninth Day of September 1975

[SEAL]

Attest:

RUTH C. MASON
Attesting Officer

C. MARSHALL DANN
Commissioner of Patents and Trademarks